United States Patent [19]

Hamano

[11] 4,401,304
[45] Aug. 30, 1983

[54] ELECTRONIC TENNIS GAME WITH INTERACTIVE CONTROLS

[75] Inventor: Nobuo Hamano, Tokyo, Japan

[73] Assignee: Tomy Kogyo Co., Inc., Tokyo, Japan

[21] Appl. No.: 222,707

[22] Filed: Jan. 5, 1981

[51] Int. Cl.³ .............................................. A63F 9/00
[52] U.S. Cl. ................................ 273/85 G; 273/1 E
[58] Field of Search ........ 273/856, 1 E, 237, DIG. 28

[56] References Cited

U.S. PATENT DOCUMENTS

| | | | |
|---|---|---|---|
| 3,583,538 | 6/1971 | Hurley | 273/85 G |
| 3,778,058 | 12/1973 | Rausch | 273/85 G |
| 3,874,669 | 4/1975 | Ariano et al. | 273/85 G |
| 4,053,740 | 10/1977 | Rosenthal | 273/85 G |
| 4,086,578 | 4/1978 | Masili | 273/DIG. 28 |
| 4,112,422 | 9/1978 | Mayer et al. | 273/85 G |
| 4,116,441 | 9/1978 | Runte et al. | 273/DIG. 28 |
| 4,147,350 | 4/1979 | Usami | 273/85 R |
| 4,215,861 | 8/1980 | Nemeth | 273/85 G |
| 4,293,734 | 10/1981 | Pepper, Jr. | 273/DIG. 28 |

FOREIGN PATENT DOCUMENTS

| | | |
|---|---|---|
| 2392690 | 12/1978 | France . |
| 1459978 | 12/1976 | United Kingdom . |
| 1502243 | 2/1978 | United Kingdom . |

OTHER PUBLICATIONS

"Monteverdi TV Sports Action Console", 8/26/77.

Primary Examiner—Vance Y. Hum
Assistant Examiner—Leo P. Picard
Attorney, Agent, or Firm—Staas & Halsey

[57] ABSTRACT

An electronic tennis game having a display panel with ball segments which are illuminated in different sequences to simulate a tennis ball which can move from one side of the tennis court to the other along different trajectories. Player elements are provided on each side of the display panel at positions which intercept the trajectories, each player element including a body portion and racket segments which can be sequentially illuminated to simulate a tennis player swinging his racket. Corresponding to each player element is a return button. A game operator attempts to ascertain the trajectory of an approaching ball and depress the return button corresponding to a player element positioned to intercept it. If the return button is depressed at the right time, the sequentially illuminated racket segments of the selected player element appear to hit the ball back to the other side of the tennis court.

17 Claims, 11 Drawing Figures

ELECTRONIC TENNIS GAME WITH INTERACTIVE CONTROLS

BACKGROUND OF THE INVENTION

The present invention relates to an amusement device, and in particular to an electrically operated game having a display panel with projectile segments which can be sequentially illuminated along predetermined trajectories to convey the impression of a moving projectile and with player elements positioned to intercept the trajectories, each player element having peripheral segments which can be sequentially illuminated upon depression of a button uniquely corresponding to that player element in order to convey the impression of a player striking at the approaching projectile. If the proper button is depressed at the proper time, so that the striking motion of a properly positioned player element intersects the trajectory, the apparent motion of the projectile element will be reversed to produce the illusion of movement along a new trajectory. The amusement device is ideally suited for use as an electrical tennis game, the game operators attempting to ascertain the trajectory of an approaching ball and selecting a return button to illuminate a player element positioned to intercept the trajectory. If the proper volley button is depressed at the proper time, the corresponding player element is illuminated and appears to strike the ball back across the court.

Ball-type games having long been a favorite in the toy art both because of the intrinsic interest of such games and their derivation from competitive sports. A number of expedients having been used to create the illusion of a moving ball. For example, Japanese Patent Publication 55-3954 and U.S. Pat. No. 4,147,350 disclose a mechanical assembly for moving a light source which projects a ball image upon a screen. Such systems tend to be complicated mechanically, however, and the trajectories which can be generated in this way are relatively limited. Discrete light sources may also be used to convey the impression of movement along a trajectory, as in the Ping Pong ball game of U.S. Pat. No. 3,583,538. Additionally, television sets have been coupled to game devices to generate a variety of trajectories, but the resulting games tend to be both expensive and non-portable. These prior art methods for simulating movement of a projectile are generally unsatisfactory because of size, complexity, expense, limited trajectories, or a combination of these factors.

The employment of fluorescent display panels and liquid crystal display panels for use in games has been suggested in Japanese Laid-open Publications 54-140499 and 54-140497.

There are also a number of prior art methods for allowing game operators to interact with the movement of a ball. For example, movement may be mechanically stopped as in Japanese application 52-24992 or reflected by a movable paddle image as in a television Ping Pong game. Neither of these interaction methods realistically simulates a tennis game, inasmuch as a tennis player typically ascertains the trajectory of an approaching ball, moves into position, and then interacts with the ball by striking it.

SUMMARY OF THE INVENTION

Accordingly, one object of the present invention is to provide a relatively inexpensive and portable amusement devices allowing sophisticated projectile trajectories and realistic interaction with the projectile.

Another objective of the present invention is to provide a portable tennis game which provides a variety of ball trajectories and player elements which are located at different positions to intercept the trajectories and which swing racket segments at the ball.

Another object of the present invention is to provide a tennis game having serve buttons for serving the ball and return buttons for establishing a return, each return button corresponding to a player element which is displayed and which swings its racket when the corresponding return button is depressed. A score display is provided for incrementing the score when the ball is missed, and trophy elements are provided to indicate the winner of the set. A sound element emits characteristic sounds when the ball bounces, when a set is completed, etc.

DETAILED DESCRIPTION OF THE PREFERRED EMBODIMENT

Figure 1:
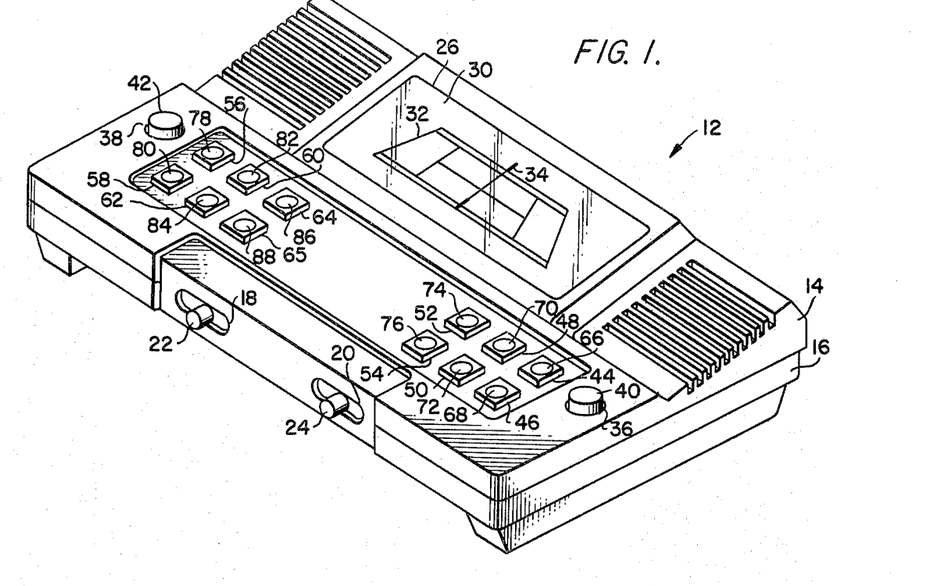
FIG. 1 is a perspective view of the tennis game of the present invention.

The moving projectile amusement device of the present invention is illustrated in FIG. 1 in the form of the preferred embodiment, tennis toy 12, which has a housing consisting of enclosure top portion 14 and enclosure bottom portions 16 joined together in a suitable manner, as by the use of screws. The peripheries of portions 14 and 16 are indented to provide elongated openings 18 and 20 through which switch handles 22 and 24 protrude. Top portion 14 includes an opening 26 behind which is disposed a transparent tinted window 30 bearing thereon indicia 32 and 34 representing a perspective view of a tennis court and tennis net, respectively. Top portion 14 also has openings 36 and 38 through which serve buttons 40 and 42 protrude, along with openings 44, 46, 48, 50, 52, 54, 56, 58, 60, 62, 64, and 65 through which return buttons 66, 68, 70, 72, 74, 76, 78, 80, 82, 84, 86, and 88 protrude. It should be noted that the serve and return buttons are symmetrically disposed on either side of the housing, with the return buttons corresponding to different positions on the court on either side of net indicium 34. Bottom portion 16 has a latched door 90 (not illustrated) allowing access to a battery compartment 92 (not illustrated) molded from the plastic forming portion 16.

Figure 3:
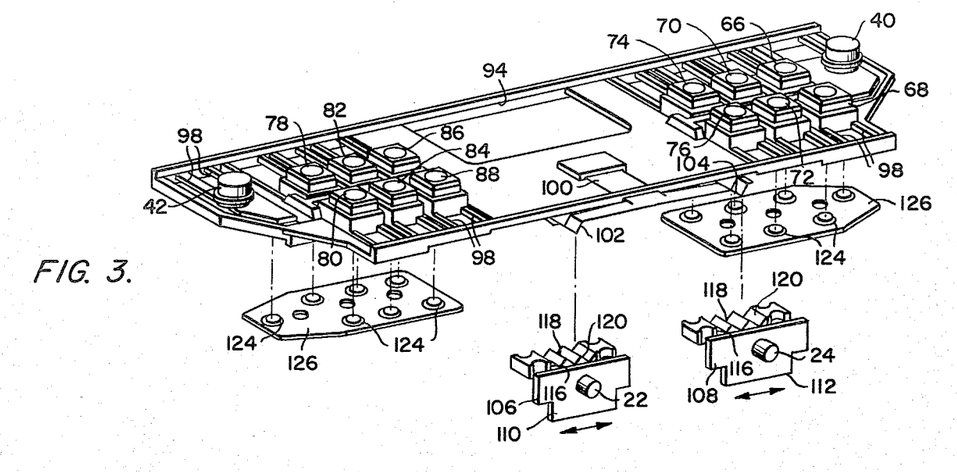
FIG. 3 is a perspective view illustrating a switch plate which cooperates with conductor patterns on a printed circuit board to provide the various switches employed by the tennis game.

With reference next to FIG. 3, button frame 94 is mounted between a printed circuit board 96 (not illustrated) and top portion 4, with the serve and return buttons protruding through the corresponding openings. Each of these buttons is movably supported by two resilient legs 98 which allow the buttons to be manually depressed. Spring element 100 having bent portions 102 and 104 is affixed to frame 94 with portions 102 and 104 disposed above slider elements 106 and 108. Slider elements 106 and 108 are guided in their movements by tabs 110 and 112, which are retained between the outer wall of portion 16 and a flange 114 (not illustrated) which extends from portion 16 and which is parallel to the outer wall thereof. Elements 106 and 108 each have a left notch 116, middle notch 118, and right notch 120 into which portions 102 and 104 can fit to allow slider elements 106 and 108 to be manually moved to one of three distinct positions. Button frame 94 and slider elements 106 and 108 cooperate with conductor patterns on printed circuit board 96 to form electrical switches. Elements 106 and 108 have metallic projections 122 (not illustrated) affixed to the bottom thereof which short conductor patterns provided on printed circuit board 96 depending upon which of notches 116, 118, and 120 are engaged by bent portions 102 and 104. It will be apparent to those skilled in the art that switch handles 22 and 24 each operate a multi-position switch. Similarly, serve buttons 40 and 42, along with return buttons 66 through 88, cooperate with conductor patterns on printed circuit board 96 to form 14 switches which are momentarily closed when the buttons are depressed. For example, two conductor patterns which are disposed beneath serve button 42 are momentarily bridged by a third conductor when button 42 is depressed. While this third conductor could be affixed directly to the underside of button 42, it is convenient to provide these bridging conductors on the undersides of bubbles 124 formed in flexible switch mats 126, which are mounted between frame 94 and printed circuit board 96. When button 42 is depressed the bubble 124 beneath it collapses to move the bridging conductor on the underside thereof into electrical contact with the printed circuit conductor pattern beneath button 42. It will be apparent to those skilled in the art that the use of button frame 94 and slider elements 106 and 108 in conjunction with an appropriately etched printed circuit board allows a number of switches, such as the switches illustrated in FIG. 10, to be economically employed without the necessity of mounting individual switches to the housing and individually wiring them to a printed circuit board containing the electrical circuit for the toy.

The electrical circuit for toy 12 preferably includes a microprocessor which accommodates several different play variations, depending upon how switch handles 22 and 24 are set. Descriptions of these variations will be introduced, when they become appropriate, as modifications of the fundamental electrical features discussed below.

Figure 2:
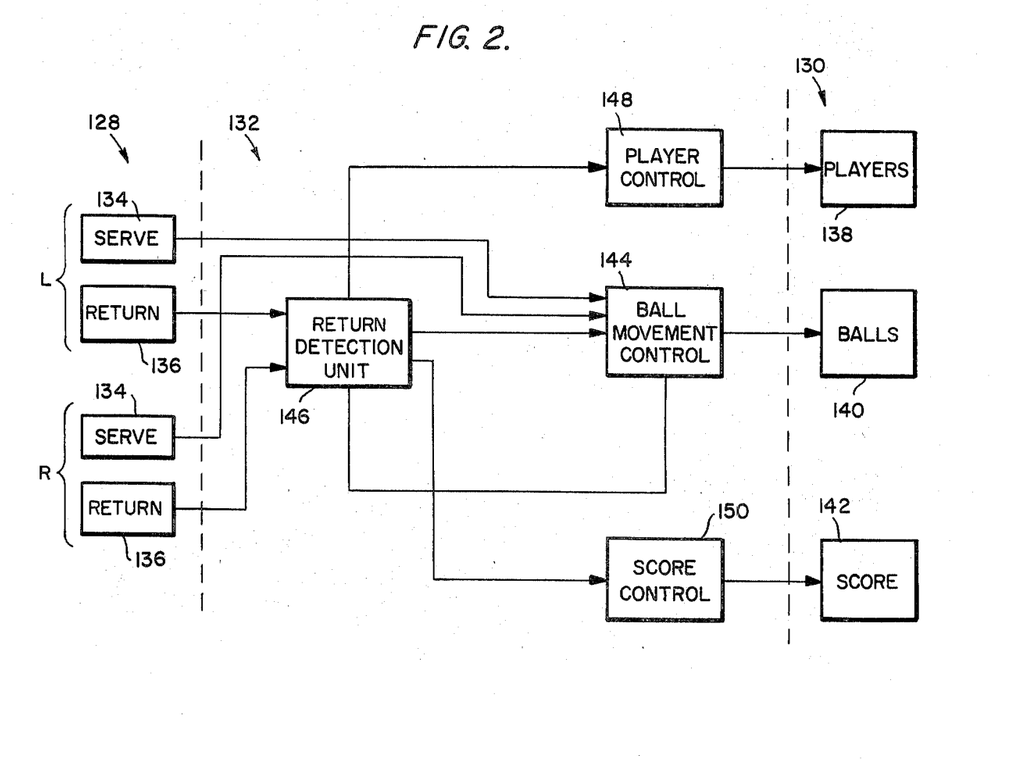
FIG. 2 is a block diagram illustrating the fundamental features of the electrical system.

The major electrical features of toy 12 are illustrated in FIG. 2, which is divided by dotted lines into a manually controlled operator switch portion 128, a display panel such as game display portion 130, and a control portion 132 which receives signals from portion 128 and which illuminates segments in portion 130 in response thereto. A serve switch 134 and a bank of return switches 136 are provided for manual operation by each of the game operators L and R, representing the left-hand and right-hand operators, respectively. Display portion 130 includes player section 138, which provides player elements located at different positions corresponding to return switches 136, ball section 140, which includes a number of ball segments which can be sequentially illuminated to convey the impression of a ball traveling along a trajectory, and score section 142.

With continuing reference to FIG. 2 control portion 132 includes ball movement control unit 144 which receives serve signals when serve switches 134 are depressed and which emits a ball movement signal to sequentially illuminate a sequence of the ball segments of section 140. Return detection units 146 receives return signals from switches 136 and emits a player swing signal to player control unit 148 which in turn generates a player control signal causing movement of that player element in section 138 corresponding to the depressed return switch. Return detection unit 146 also receives ball trajectory signals from unit 144 and determines whether the correct volley switch was depressed at the appropriate time, in which case a ball hit signal is emitted to cause control unit 144 to modify the sequence in which the ball segments are illuminated so as to "return" the ball, or create the illusion that the ball's motion has been generally reversed by the player element. If the appropriate return switch has not been depressed at the appropriate time to return the ball, unit 146 emits a ball miss signal to score control unit 150, which in turn generates a score control signal for score section 142 of the display.

Figure 4:
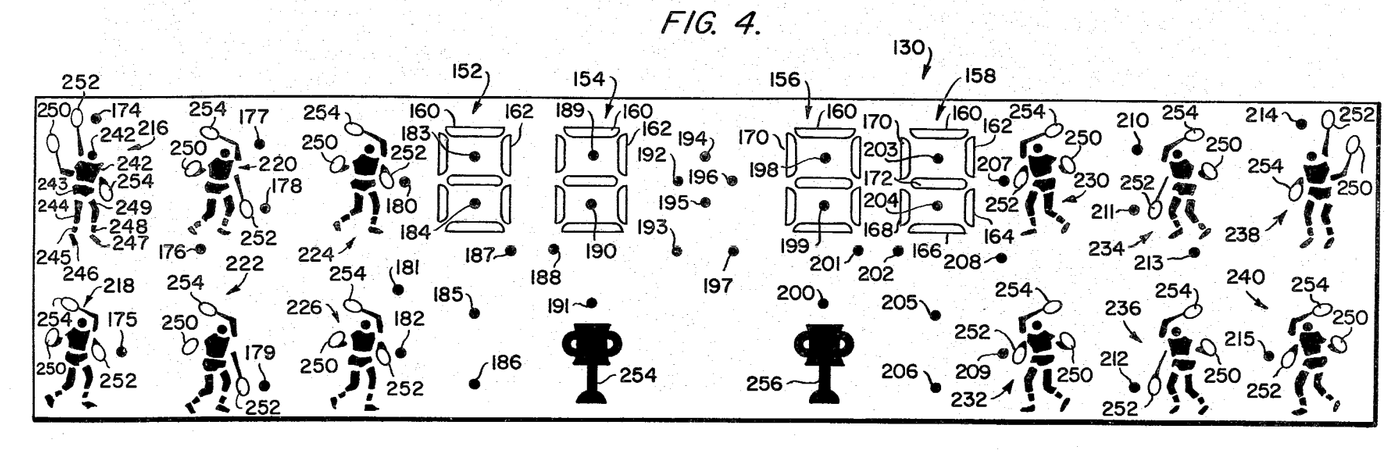
FIG. 4 illustrates the segments on the fluorescent indicator display panel.

The positions and shapes of the segments which may be illuminated in display portion 130 are illustrated in FIG. 4. Score section 142 includes four patterns 152, 154, 156, and 158 each having seven segments 160, 162, 164, 166, 168, 170, and 172 disposed in the traditional pattern for digital display. Ball section 140 includes 42 circular ball segments 174–215. Player section 138 includes twelve player elements 216, 218, 220, 222, 224, 226, 230, 232, 234, 236, 238, and 240, each including nine body segments 242-249 which are electrically connected and three peripheral or racket segments 250, 252, and 254 which are electrically insulated from each other and from body segments 242-249. Two trophy segments 256 and 258 are also provided. It should be noted that game display portion 130 is symmetrically disposed about a central line running through ball segments 194 and 195.

Figure 6:
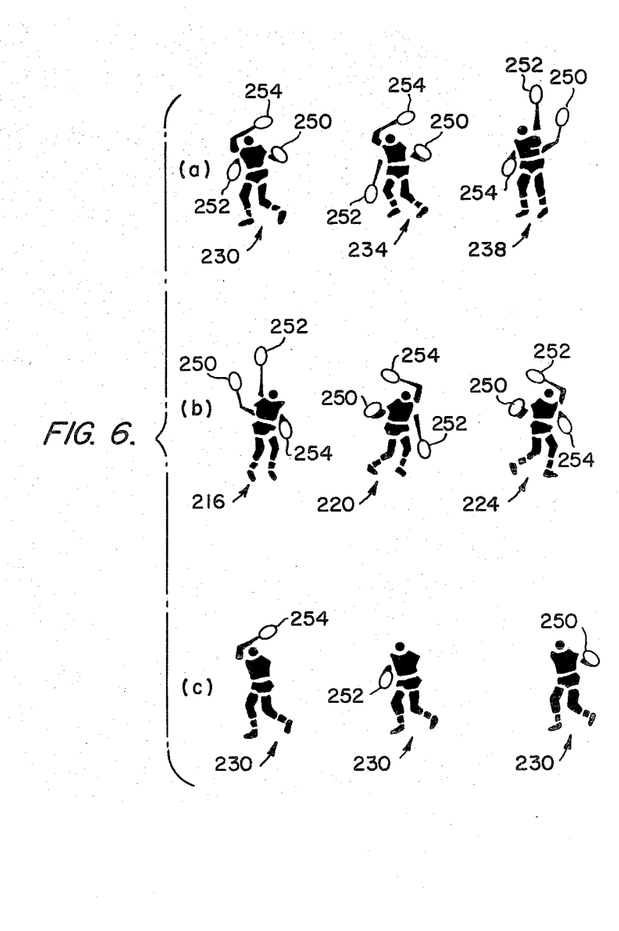
FIG. 6 illustrates the various configurations of the player elements and sequential activation of the racket segments while the body segments are illuminated.

With reference next to FIG. 6, it should be observed that the three player elements in FIG. 6(a), which correspond to the player elements in the upper right hand side of FIG. 4, are the mirror image of the player elements in FIG. 6(b), which correspond to the three player elements in the upper left hand corner of FIG. 4. It should be observed that the player elements in FIG. 6(a) are not identical; for example, player element 238 (and particularly the position of racket segment 252) is not identical to elements 230 and 234, although it is the mirror image of player element 216 and FIG. 6(b). It will be apparent to those skilled in the art that the illusion of motion will be generated if the racket segments corresponding to a player element are sequentially illuminated, with the body segments being continuously illuminated during this sequence. An example is illustrated in FIG. 6(c), which illustrates three different positions which may be attained by player element 230 in FIG. 6(a). The right-most illustration in FIG. 6(c) illustrates the visible image when body segments 242-249 of player element 230 are activated along with racket segment 250. The middle illustration results when racket segment 250 is extinguished and the body segments and racket segment 252 are illuminated, while the left-most illustration results when racket segment 254 is finally illuminated along with the body segments. The composite image corresponds to a tennis player executing a backstroke. A slightly different motion results when the racket segments 250, 252, and 254 of player element 234 are sequentially illuminated, while player element 238 executes a serving motion. Such a serving motion is not employed on the bottom half of FIG. 4, and it will be noted that player element 240 is identical to player element 230 rather than to player element 238 and, similarly, that player element 218 is identical to player element 224 rather than to player element 216. It will be appreciated that the six player elements on the right hand side of FIG. 4 each correspond in position to one of the return buttons 66, 68, 70, 72, 74, and 76, while the six player elements on the left hand side of FIG. 4 correspond to the six return buttons 78, 80, 82, 84, 86, and 88.

Figure 5:
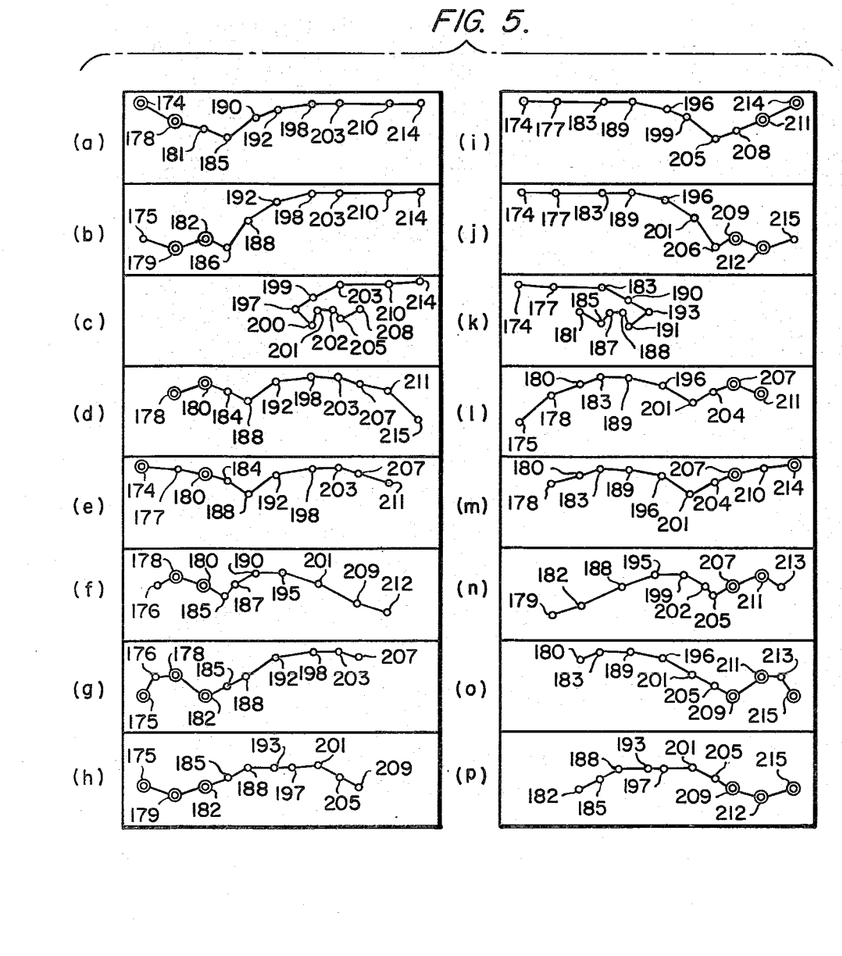
FIG. 5 illustrates the various ball trajectories.

Ball segments 174-215 are sequentially illuminated in predetermined sequences along various trajectories, illustrated in FIG. 5, each time the ball is served or returned. FIGS. 5(a)-(h) represent the set of possible trajectories when the ball is hit by a player element controlled by the right-hand game operator R, either by service or by return. The ball is served when the right-hand game operator depresses his serve button 40, whereupon racket segments 250, 252, and 254 of player element 238 are sequentially illuminated to convey the impression of a swinging movement which sends the ball along one of the three trajectories illustrated in FIG. 5(a), 5(b) or 5(c). The electronics of toy 12 selects these "serve" trajectories on the basis of probability, with the possibility of the trajectory illustrated in FIG. 5 (a) being ½, the probability of the trajectory illustrated in FIG. 5(b) being ⅜, and the probability of the "fault" trajectory illustrated in FIG. 5(c) being ⅛. This "fault" trajectory, of course, represents the situation when the ball is served into the net. This uncertainty concerning the trajectory of the ball following service, and in particular the provision of a low-probability "fault" trajectory, increases the realism of the game and consequently the enjoyment derived from playing it. There is no choice of trajectories, however, when the ball is returned. For example, when the right-hand game operator depresses return button 66 at the correct time to intercept an approaching ball, the return proceeds along the projectory illustrated in FIG. 5(a). Similarly, there are unique "return" trajectories for each of the remaining player elements controlled by the right-hand game operator. A return by player element 240 proceeds along the trajectory illustrated in FIG. 5(d), a return by player element 234 proceeds along the trajectory illustrated in FIG. 5(e), a return by player element 236 proceeds along the trajectory of FIG. 5(f), a return by player element 230 proceeds along the trajectory illustrated in FIG. 5(g), and a return by player element 232 proceeds along the trajectory illustrated in FIG. 5(h). In short, the service trajectories are illustrated in FIGS. 5(a)-(c), with the trajectory in FIG. 5(a) being the most probable. FIG. 5(a) also represents one of the return trajectories, with the remaining return trajectories being illustrated in FIGS. 5(d)-(h), depending upon which return button the right-hand game operator has depressed.

With continuing reference to FIGS. 4 and 5, the positions in FIG. 5 illustrated by concentric circles represent those points on the trajectories where the ball can be intercepted by the opposing or left-hand player to create a return. These ball segments can be deemed "returnable" segments. For example, if the ball is proceeding along the trajectory illustrated in FIG. 5(a) and the left-hand game operator depresses return button 82 at the appropriate moment, player element 220 will be illuminated and swinging its racket so that racket segment 252 and ball segment 178 will be simultaneously illuminated, as though the swinging racket had smashed ino the approaching ball. Since the ball has been returned element 178 will not be illuminated as the last element of the sequence illustrated in FIG. 5(a); instead, the ball will be returned to the right-hand game operator. The left-hand game operator's three service trajectories, illustrated in FIGS. 5(i), (j), and (k), along with the six return trajectories illustrated in FIGS. 5(i) and (l)-(p), are mirror images of the corresponding trajectories of the right-hand game operator, which have already been discussed. Accordingly, continuing the above example wherein the left-hand game operator returned the ball when ball segment 178 was illuminated, the ball will be returned to the right-hand game operator along the trajectory illustrated in FIG. 5(m). The left-hand game operator could have also returned the ball traveling along the trajectory of FIG. 5(a) by depressing his return button 178 at the appropriate time and returning the ball from position 174. FIG. 5(i) illustrates the return trajectory in this event. The right-hand operator would then have an opportunity to return the ball at either of points 211 or 214. It will be noted from FIGS. 4 and 5 that there are at least two opportunities to return a ball travelling along any of the trajectories of FIG. 5 (except the fault trajectories of FIGS. 5(c) and (k), of course) and that the returnable positions correspond to those ball elements closest to the racket segments 252 which can be deemed the "returning" racket segments. This feature also adds its share of realism to the game, for it is apparent that an actual tennis player may return an approaching ball from several positions, but he should hit it with his racket swinging. To operate game 12 successfully a game operator must ascertain the trajectory of the approaching ball, select one of the return buttons corresponding to a player element positioned along that trajectory, and depress this return button before the ball has arrived so that the returning racket segment 252 and the corresponding returnable ball segment are simultaneously illuminated. If the button is depressed too soon or too late the ball will appear to whizz by the player without being struck. In short, the racket segments of a player element are illluminated in the sequence 250, 252, and 254 after the corresponding return button has been depressed, so that the button must be depressed shortly before the ball arrives in order for the returnable ball segment and returning racket segment 252 to be simultaneously illuminated. If the wrong return button is depressed, or if either racket segment 250 or 254 is illuminated when one of the ball segments illustrated by concentric circles in FIG. 5 is illuminated, the ball will not be returned.

Figure 7:
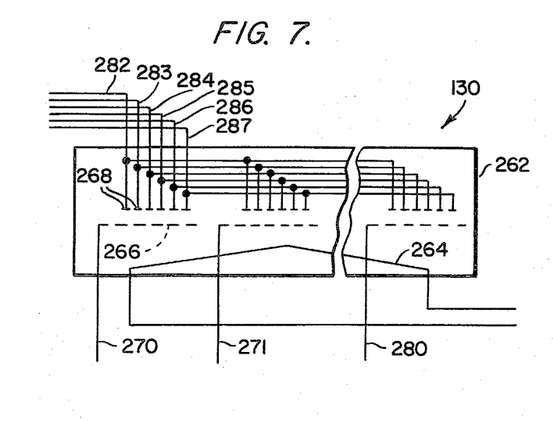
FIG. 7 illustrates the structure for illuminating a desired segment of the display panel.
Figure 8:
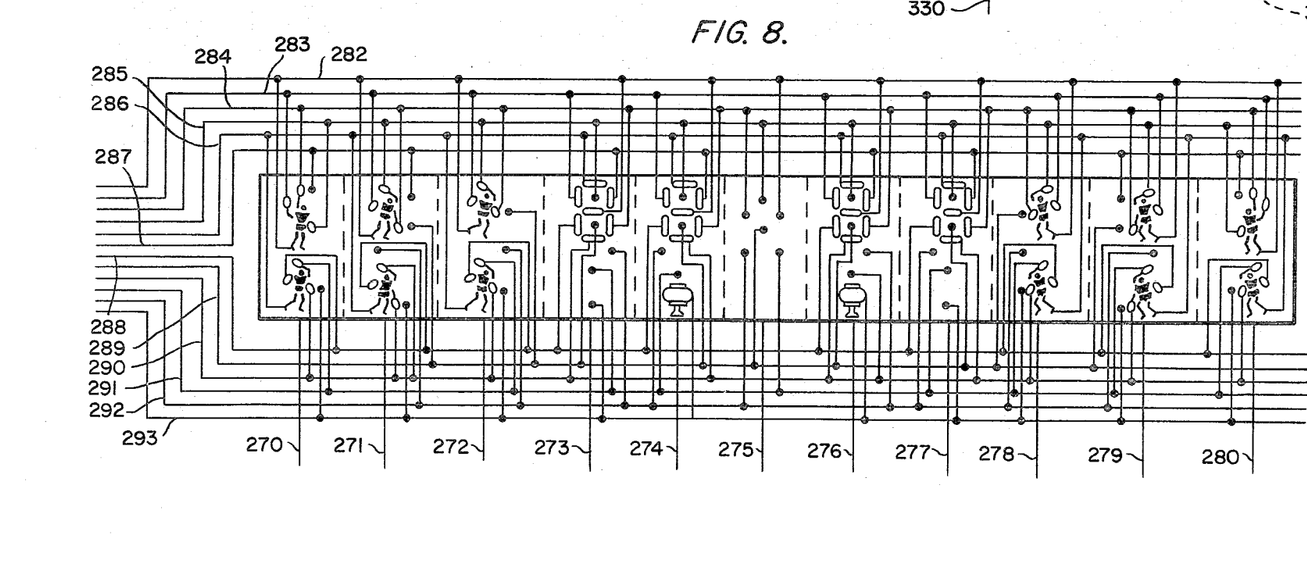
FIG. 8 illustrates how the system of FIG. 7 may be used to illuminate segments on the display panel.

Turning now to FIGS. 7 and 8, display portion 130 is preferably a fluorescent indicator panel mounted on printed circuit board 96 beneath window 30, with rubber mounting elements 260 (not illustrated) being used to protect glass envelope 262 from shocks. Suitable devices are known in the art and are commercially available, for example, from Nippon Electric Company, Ltd., 33-1 Shiba 5-chome, Minato-ku, Tokyo, Japan. Cathode 264 boils off electrons which are controlled by grids 266 and attracted to anodes 268 in a well-known manner. Anodes segments 268 are shaped and positioned as illustrated in FIG. 8, and are coated with a phosphorescent material in order to emit light when bombarded with electrons. Reference numbers have not been applied to the anode segments illustrated in FIG. 8 in order to avoid confusion, but it is noted that these elements correspond to the player elements, ball segments, etc. of FIG. 4. In FIG. 8 grids 266 are sequentially biased "ON" by potentials on conductors 270-280, while the anodes are connected to conductors 282-293. It will be apparent to those skilled in the art that any particular anode segment may be selected by simultaneously enabling one of the grid conductors and one of the anode conductors. For example, right-hand trophy segment 256 can be illuminated by simultaneous potentials on grid conductor 276 and anode conductor 293. The grid conductors can be rapidly scaned in a manner known in the art, with the anode voltages rapidly adjusted accordingly, in order to create persistent images. A liquid crystal display panel might also be used, of course.

Figure 9:
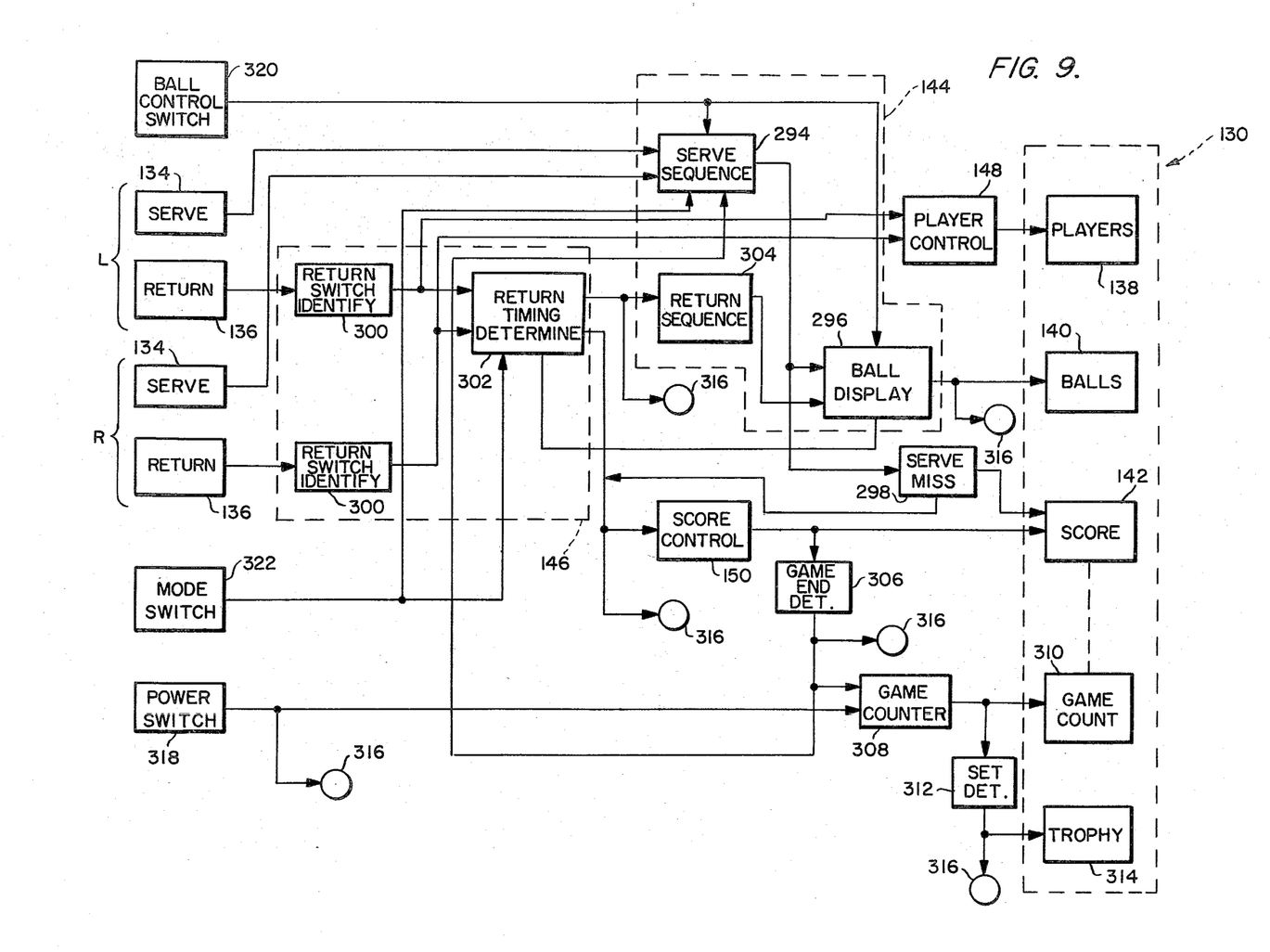
FIG. 9 is a block diagram of the tennis game, more detailed than FIG. 2.

Now that the nature of the display panel has been discussed, a more thorough discussion of the electronics can be presented. With reference to FIG. 9, the serve signals emitted by serve switches 134 are received by serve sequence generator unit 294, which selects one of the serve trajectories illustrated in FIG. 5. Unit 294 provides an output signal for ball display unit 296, which emits the ball trajectory control signal to illuminate the selected sequence of ball segments 174-215. The output of serve sequence generator 294 is also provided to service miss detector 298, which identifies double faults by determining whether unit 294 has generated two consecutive fault trajectories. The output of sevice miss detector 298 is provided to score section 142, which briefly displays "F" to indicate a single fault and "FF" to indicate a double fault. The return signals from return switches 136 are received by return switch identification units 300, which detect when a return switch has been depressed and which then emit switch identification output signals designating which switch was closed. These switch identification output signals are received by player control unit 148, which illuminates the body segments of the designated player element and sequentially activates the three corresponding racket segments in the manner previously described, if the return button was depressed while the ball was approaching. However, the player element is not illuminated if the return button was depressed as the ball was moving away from the player element rather than toward it. The switch identification output signals, along with an output signal from ball display unit 296, are also provided to return timing determination unit 302. Unit 302 emits the ball hit signal if the return button was depressed at the proper time to return the ball; that is, if a returning racket segment 252 and the corresponding returnable ball segment are simultaneously illuminated. The ball hit signal is received by return sequence generator 304, which establishes the trajectory of the return as illustrated in FIG. 5. The output of generator 304 is provided to ball display unit 296 so that the return trajectory will be displayed on display portion 130. The speed of the ball along the return trajectory depends upon the position of the ball when it was hit; a ball returned by player elements 234, 236, 220, or 222 is faster than a ball returned by player elements 230, 232, 224, or 226, which represent positions closer to the net. In the event that unit 302 fails to detect that the proper return button was depressed at the proper time to return the ball, the ball miss signal is emitted to score control unit 150, which generates the score control signal for score section 142 of the display. The score displayed for each game operator progresses from zero to 15 to 30 to 40 to game, depending upon the ball miss signals and double fault signals, with a score such as "15 30" being briefly flashed on score section 142 each time the score changes. Game end detector 306 emits a game end signal when a game point has been scored. The game end signal is supplied to serve sequence generator 294 to indicate that the opponent is entitled to service and to game counter 308, which briefly flashes the number of games each player has won (such as "0 1") on game count section 310. In the present embodiment the seven segment patterns 152, 154, 156, and 158 are utilized for both score sections 142 and game count section 310, and accordingly these sections are joined by a dotted line in FIG. 9. Set detector 312 detects when one game operator or the other has won six games, and illuminates the appropriate trophy 254 or 256 of trophy display section 214.

With continuing reference to FIG. 9, sound element 316 is illustrated in six different positions in order to simplify the diagram, although only one sound element is actually employed. A peizoelectric element mounted within portion 16 and acoustically connected thereto is preferable, such piezoelectric elements being well known in the art. As is indicated by the diagram, a characteristic sound is emitted each time the ball hit or ball miss signal appears and each time a game or a set is completed. Sound element 316 is also responsive to ball display unit 296 and emits a characteristic "bounce" sound each time the ball element at a minimum position on the trajectories illustrated in FIG. 5 is illuminated. For example, in the trajectory illustrated in FIG. 5(a), the bounce sound is emitted when element 185 is illuminated. Sound element 316 is also responsive to power switch 318, so that a sound is emitted when toy 12 is turned on. Simultaneously, the contents of game counter 308 are set to zero and the score "0 0" briefly appears.

As was mentioned above, several game variations are possible Ball control switch 320, operated by switch handle 22, may be provided to allow different levels of game difficulty. One switch position provides the game as described above, while a second switch position signals serve ball display unit 296 to reduce the speed of the ball in order to make it easier for the game operators to establish a volley. A third switch position signals serve sequence generator 294 to select only one of the serve trajectories upon which the game operator may serve. Mode switch 322, operated along with power switch 318 by switch handle 24, allows the microprocessor to replace one of the game operators. The microprocessor automatically returns the ball and establishes a contest, but is programmed to miss in a random fashion so that the manual game operator can win by playing a perfect game.

Figure 10:
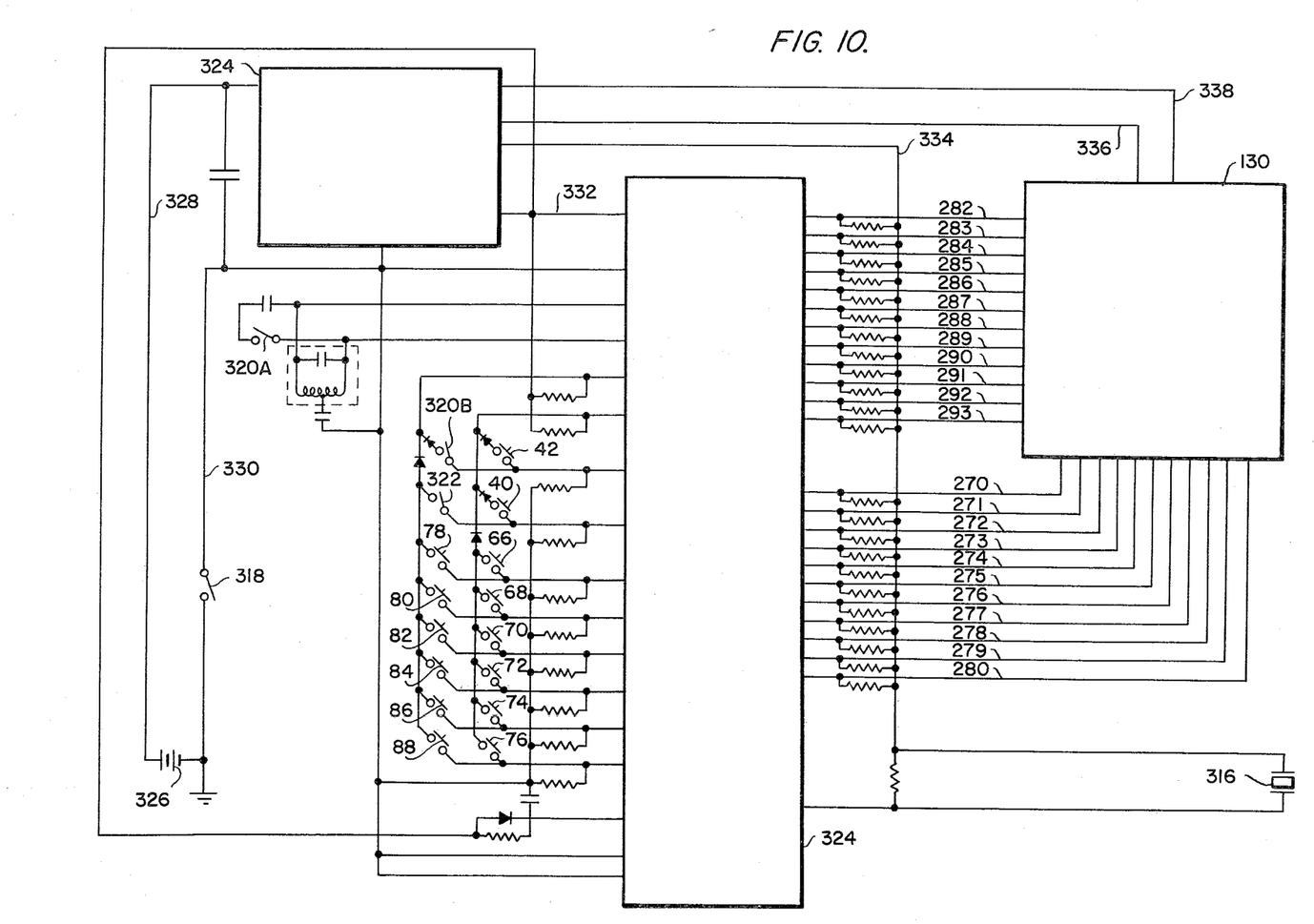
FIG. 10 is the circuit diagram of a practical embodiment of the present invention.
Figure 11:
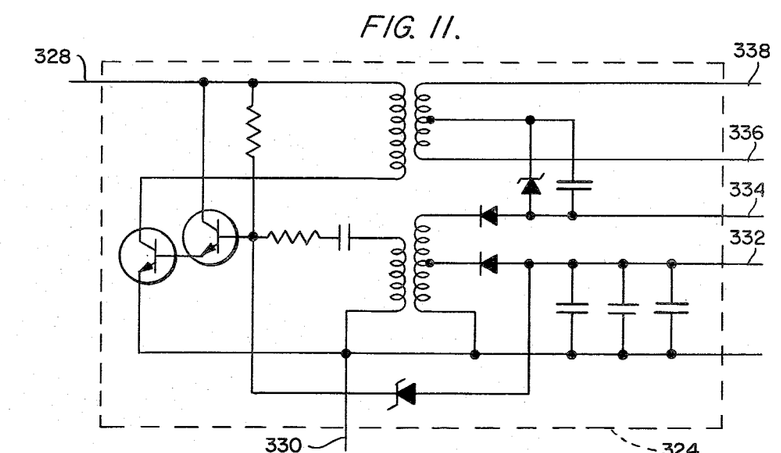
FIG. 11 illustrates a circuit for the converters shown in block form in FIG. 10.

FIG. 10 illustrates a practical embodiment of the game illustrated in FIG. 9. Microprocessor 324 is a uPD552C microprocessor commercially available from Nippon Electric Company, Ltd., 33-1, Shiba 5-chrome, Minato-ku, Tokyo, Japan. This microprocessor, which includes an internal ROM and an internal RAM, is the high negative output version of the same manufacturer's popular uCOM-44 microprocessor, with outputs capable of being pulled to the negative levels required for direct interfacing with display 130, as indicated in the drawing. Converter 324 receives power from battery 326 along conductors 328 and 330 and provides minus 10 volts to the microprocessor along conductor 332 and minus 30 volts for display 130 along conductor 334. Converter 324 also supplies filament current to display 130 via conductors 336 and 338. The filament current is an 8 volt peak-to-peak 50 KHZ AC waveform, approximately square wave, with an average value of minus 25 volts. A suitable circuit for converter 324 is illustrated in FIG. 11. Switches 320A and 320B, corresponding to ball control switch 320 in FIG. 9, and physically coupled for control by switch handle 22 in the manner previously discussed. Similarly, power switch 318 and mode switch 322 are coupled for control by switch handle 24. The serve and return switches are identified by the reference numbers of the associated operator buttons which close them. It will be apparent from FIG. 10 that the physical circuitry for game 12 employs a minimum number of components, thereby keeping manufacturing costs as low as possible.

What is claimed is:

1. An amusement device, comprising:
   a housing;
   a limited plurality of manually operable first return buttons mounted on said housing;
   a display panel having first and second sides mounted on said housing, said panel having a limited plurality of projectile segments permanently disposed between the first and second sides of said panel and a limited plurality of first player elements permanently disposed adjacent said first side of said panel, each of said first player elements corresponding to one of said first return buttons and comprising at least one body segment and a limited plurality of peripheral segments, one of said peripheral segments of each first player element being a returning peripheral segment disposed adjacent a corresponding returnable projectile segment; and
   first means for sequentially displaying projectile segments along a limited plurality of predetermined first trajectories toward said first side of said panel, each of said first trajectories including at least one returnable projectile segment and at least one first trajectory including a returnable projectile segment corresponding to the returning peripheral segment of one first player element and a returnable projectile segment corresponding to the returning peripheral segment of another first player element, said first means including second means for displaying said at least one body segment of a first player element while sequentially displaying its peripheral segments when the corresponding first return button is depressed as said projectile segments are being displayed along a first trajectory and third means for sequentially displaying projectile segments along a predetermined second trajectory toward said second side of said panel if a returning peripheral segment of a first player element and its corresponding returnable projectile segment are simultaneously displayed, the second trajectory displayed when the returning peripheral segment of said one first player element and its corresponding returnable projectile element are simultaneously displayed being different from the second trajectory displayed when the returning peripheral segment of said another first player element and its corresponding returnable projectile segment are simultaneously displayed.

2. The amusement device of claim 1, further comprising a limited plurality of manually operable second return buttons mounted on said housing, and wherein said display panel further includes a limited plurality of second player elements permanently disposed adjacent said second side of said panel, each of said second player elements corresponding to one of said second return buttons and comprising at least one body segment and a limited plurality of peripheral segments, one of said peripheral segments of each second player element being a returning peripheral segment disposed adjacent a corresponding returnable projectile segment, and wherein said first means further comprises fourth means for displaying said at least one body segment of a second player element while sequentially displaying its peripheral segments when the corresponding second return button is depressed as said projectile segments are being displayed along a second trajectory and fifth means for sequentially displaying projectile segments along a predetermined first trajectory toward said first side of said panel if a returning peripheral segment of a second player element and its corresponding returnable projectile segment are simultaneously displayed.

3. The amusement device of claim 2, wherein said display panel further comprises a plurality of first score segments and a plurality of second score segments, and wherein said first means further comprises sixth means for displaying an incremented score on said plurality of first score segments if a returning peripheral segment of a second player element is not displayed simultaneously with a corresponding returnable projectile segment when projectile segments along a second trajectory are sequentially displayed, and seventh means for displaying an incremented score on said plurality of second score segments if a returning peripheral segment of a first player element is not displayed simultaneously with a corresponding returnable projectile segment when projectile segments along a first trajectory are sequentially displayed.

4. The amusement device of claim 3, wherein said first means further comprises at least one manually operable serve button and eighth means for sequentially displaying projectile segments along one of said first and second trajectories if said at least one serve button is depressed following a change in the score displayed on said first and second score segments.

5. The amusement device of claim 3, further comprising a sound element mounted on said housing, and wherein said first means further comprises ninth means for activating said sound element if a returnable projectile segment and the corresponding returning peripheral segment of a player element are simultaneously displayed.

6. The amusement device of claim 5, wherein said first and second trajectories include projectile bounce segments located at minimum positions, and wherein said ninth means further comprises means for activating said sound element when a projectile bounce segment is displayed.

7. The amusement device of claim 6, further comprising manually operable switch means for changing the rate at which said projectile elements are displayed.

8. The amusement device of claim 7, wherein the body segments of said first and second player elements are configured as tennis players and the peripheral segments of said first and second player elements are configured as tennis rackets.

9. The amusement device of claim 1, 2, 3, 4, 5, 6, 7, or 8, wherein at least one first trajectory includes a returnable projectile segment corresponding to one first player element and a returnable projectile segment corresponding to another first player element.

10. The amusement device of claim 9, wherein the peripheral segments of the first player elements are disposed at generally radial positions with respect to the body segments of the first player elements and wherein the second means displays peripheral segments in a rotating sequence, the rotational direction of at least one first player element when its corresponding first return button is depressed being different from the rotational direction of at least one other first player element when its corresponding first return button is depressed.

11. The amusement device of claim 9, wherein said second means further comprises means for repeatedly displaying first player elements in response to repeated depression of first return buttons as said projectile segments are being displayed along a first trajectory.

12. The amusement device of claim 4, 5, 6, 7, or 8, wherein said eighth means further comprises means for sequentially displaying projectile segments along at least one fault trajectory, the projectile segments being displayed in a sequence headed first toward one side of said panel and then away from that side.

13. The amusement device of claim 12, wherein at least one first trajectory includes a returnable projectile segment corresponding to one first player element and a returnable projectile segment corresponding to another first player element, and wherein at least one second trajectory includes a returnable projectile segment corresponding to one second player element and a returnable projectile segment corresponding to another second player element.

14. The amusement device of claim 13, wherein the peripheral segments of the first player elements are disposed at generally radial positions with respect to the body segments of the first player elements, wherein the peripheral segments of the second player elements are disposed at generally radial positions with respect to the body segments of the second player elements, wherein the second means displays peripheral segments in a rotating sequence, the rotational direction of at least one first player element when its corresponding first return button is depressed being different from the rotational direction of at least one other first player element when its corresponding first return button is depressed, and wherein the fourth means displays peripheral segments in a rotating sequence, the rotational direction of at least one second layer element when its corresponding second return button is depressed being different from the rotational direction of at least one other second player element when its corresponding second return button is depressed.

15. The amusement device of claim 14, wherein said second means further comprises means for repeatedly displaying first player elements in response to repeated depression of first volley buttons as said projectile segments are being displayed along a first trajectory, and wherein said fourth means further comprises means for repeatedly displaying second player elements in response to repeated depression of second return buttons as said projectile segments are being displayed along a second trajectory.

16. An amusement device, comprising:
a housing having first and second sides;
a limited plurality of manually operable first return buttons mounted adjacent the first side of said housing;
a first manually operable serve button mounted adjacent the first side of said housing;
a limited plurality of manually operable second return buttons mounted adjacent the second side of said housing;
a second manually operable serve button mounted adjacent the second side of said housing;
a display panel having first and second sides mounted on said housing, said panel having
a limited plurality of ball segments permanently disposed between the first and second sides of said panel,
a limited plurality of first player elements permanently disposed adjacent said first side of said panel, each of said first player elements corresponding to one of said first return buttons and comprising at least one body segment and a limited plurality of racket segments, one of said racket segments of each first player element being a returning racket segment disposed adjacent a corresponding returnable ball segment, and
a limited plurality of second player elements permanently disposed adjacent said second side of said panel, each of said second player elements corresponding to one of said second return buttons and comprising at least one body segment and a limited plurality of racket segments, one of said racket segments of each first player element being a returning racket segment disposed adjacent a corresponding returnable ball segment, and
a limited plurality of second player elements permanently disposed adjacent said second side of said panel, each of said second player elements corresponding to one of said second return buttons and comprising at least one body segment and a limited plurality of racket segments, one of said racket segments of each second player element being a returning racket segment disposed adjacent a corresponding returnable ball segment; and
control means for sequentially illuminating ball segments along a serve trajectory in response to depression of a serve button, the serve trajectory including at least two returnable ball segments, each corresponding to the returning racket segment of a different player element, illuminating the body segments of a player element while sequentially illuminating its racket segments in response to depression of the return button corresponding to the player element as said ball segments are being illuminated, and sequentially illuminating ball segments along a return trajectory if a returning racket segment is illuminated at the same time as the corresponding returnable ball segment, the return trajectories arising from said at least two returnable ball segments included in said serve trajectory being different.

17. The amusement device of claim 16 wherein said control means comprises ball movement control means responsive to serve signals produced upon depression of said serve buttons for generating ball movement signals to sequentially illuminate ball segments, return detection unit means responsive to return signals produced upon depression of said return buttons for generating player swing signals, player control unit means responsive to said player swing signals for generating player control signals to illuminate body segments while sequentially illuminating racket segments, said return detection unit means additionally generating ball hit signals for said ball movement control means and said ball movement control means additionally generating ball trajectory signals for said return detection unit.

* * * * *